C. E. BUSHYEAGER.
NUT LOCKING WASHER.
APPLICATION FILED JAN. 17, 1911.
1,162,566.
Patented Nov. 30, 1915.
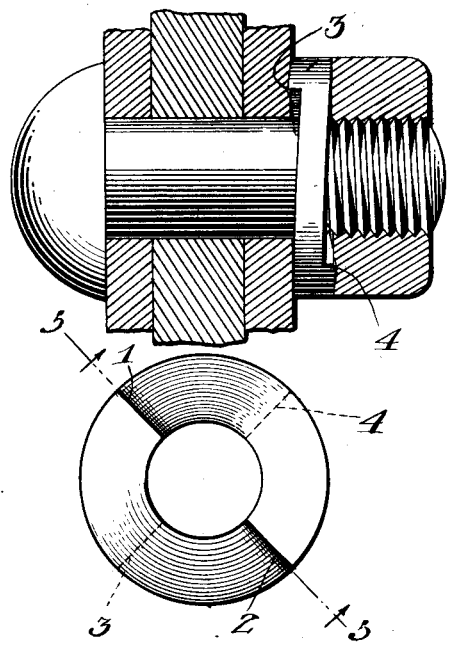
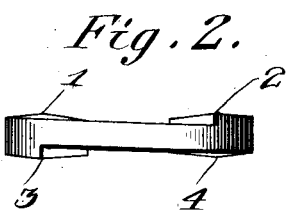
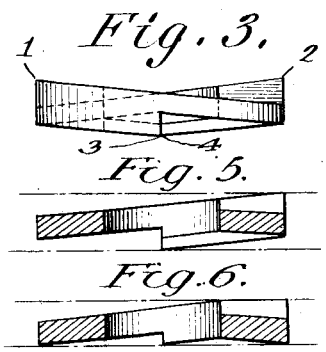
Witnesses:
Inventor.
Charles E. Bushyeager,
By
Attorney

UNITED STATES PATENT OFFICE.

CHARLES E. BUSHYEAGER, OF WILKINSBURG, PENNSYLVANIA.

NUT-LOCKING WASHER.

1,162,566.     Specification of Letters Patent.     Patented Nov. 30, 1915.

Application filed January 17, 1911. Serial No. 603,155.

*To all whom it may concern:*

Be it known that I, CHARLES E. BUSH-YEAGER, a citizen of the United States, residing at Wilkinsburg, in the county of Allegheny and State of Pennsylvania, have invented certain new and useful Improvements in Nut-Locking Washers, of which the following is a specification.

My invention consists in an improved construction of lock washers for securing nuts in position, which will act positively and automatically and with equal efficiency either face out, thus providing a "reversible" positive lock for nuts, all as will be hereinafter more fully described and claimed.

Referring to the accompanying drawings which are made a part hereof and on which similar reference characters indicate similar parts, Figure 1 is a face view of the washer constructed in accordance with my invention, Fig. 2 an edge elevation, Fig. 3 another edge view of the washer, Fig. 4 a view showing the washer in combination with the nut and bolt, as when in use, the washer being shown in edge elevation in position to show two of its engaging faces 2 and 3 as when in operation, Fig. 5 a cross section on the dotted line 5—5 in Fig. 1, showing the washer before compression, and Fig. 6 a similar view showing the washer after compression, as in use.

The washer is preferably of steel, or other hard metal, and is formed with four radial shoulders 1, 2, 3 and 4, two of which are in one side and two in the opposite side thereof. A spiral or tapered face extends from each shoulder to a diametrically opposite point, each tapered face being inclined toward the center adjacent the crest of the shoulder which it forms and gradually cutting away the metal as it extends spirally around the washer to a point diametrically opposite and at the base of the oppositely arranged shoulder, where it will be noted that the tapered face is inclined toward the periphery of the washer, the inclination of the face remaining unchanged throughout its length. The opposite side of the washer is correspondingly formed except the shoulders in one side are midway between the shoulder in the other side of the washer and stand with their shoulders facing in opposite directions. The inclined shoulders thus formed afford a bearing and locking surface for the nut and the part against which the opposite side of the washer bears, all of which will be hereinafter more clearly described and claimed.

In the operation of this device the locking washer which is formed with diametrically oppositely arranged inclined shoulders on each side thereof, the inclined shoulders on one side being arranged midway between the shoulders on the opposite side, is placed on the bolt between the nut and part against which the opposite side of the washer is adapted to bear. The corners of the inclined shoulders thus formed at the periphery of the washer being slightly higher than the inner corners are first to contact with their opposing surface as the nut is turned on the bolt, and as pressure is increased the corners on one side of the washer will be simultaneously forced backward as the intermediate corners on the opposite side are forced forward, thus warping the washer and causing the full length of the radial shoulders to grip its opposing surface with the pressure exerted by the spring in the metal to hold the parts from becoming loose. The nut is thus locked securely on the bolt and the several parts rigidly secured together.

Having thus fully described my said invention what I claim as new, and desire to secure by Letters Patent is:

A nut locking washer formed of a solid piece of metal having two tapered faces on each of the opposite sides thereof, shoulders formed by said tapered faces, said faces extending from diametrically opposite points for one-half the distance around said washer and arranged midway between the shoulders on the opposite side, each tapered face being inclined toward the center adjacent the crest of the shoulder it forms and inclined toward the periphery of said locking washer adjacent the base of the shoulder formed by the inclined tapered face diametrically opposite, substantially as set forth.

In witness whereof, I have hereunto set my hand and seal at Washington, District of Columbia, this 13th day of January, A. D. nineteen hundred and eleven.

CHARLES E. BUSHYEAGER. [L. S.]

Witnesses:
E. W. BRADFORD,
J. D. YOAKLEY.